(12) United States Patent
Veshchikov et al.

(10) Patent No.: US 11,409,845 B2
(45) Date of Patent: Aug. 9, 2022

(54) METHOD FOR DETERMINING IF A MACHINE LEARNING MODEL HAS BEEN COPIED

(71) Applicant: NXP B.V., Eindhoven (NL)

(72) Inventors: Nikita Veshchikov, Brussels (BE); Joppe Willem Bos, Wijgmaal (BE); Simon Johann Friedberger, Heverlee (BE)

(73) Assignee: NXP B.V., Eindhoven (NL)

( * ) Notice: Subject to any disclaimer, the term of this patent is extended or adjusted under 35 U.S.C. 154(b) by 869 days.

(21) Appl. No.: 16/250,074

(22) Filed: Jan. 17, 2019

(65) Prior Publication Data

US 2020/0233936 A1    Jul. 23, 2020

(51) Int. Cl.
| | |
|---|---|
| *G06N 20/00* | (2019.01) |
| *G06F 21/12* | (2013.01) |
| *G06K 9/62* | (2022.01) |
| *H04L 9/32* | (2006.01) |
| *G06F 11/10* | (2006.01) |

(52) U.S. Cl.
CPC ........... *G06F 21/12* (2013.01); *G06K 9/6259* (2013.01); *G06N 20/00* (2019.01); *G06F 11/10* (2013.01); *G06F 2221/0724* (2013.01); *H04L 9/3236* (2013.01)

(58) Field of Classification Search
CPC ......... G06N 20/00; G06N 7/005; G06F 11/10
See application file for complete search history.

(56) References Cited

U.S. PATENT DOCUMENTS

| | | |
|---|---|---|
| 2017/0206449 A1 | 7/2017 | Lain |
| 2019/0087603 A1 | 3/2019 | Dror et al. |

(Continued)

FOREIGN PATENT DOCUMENTS

| | | |
|---|---|---|
| CN | 104680473 A | 6/2015 |
| CN | 106651805 A | 5/2017 |

(Continued)

OTHER PUBLICATIONS

Abadi, Martin et al.; "TensorFlow: Large-scale Machine Learning On Heterogeneous Systems;" Preliminary White Paper, Nov. 9, 2015; software available from tensorflow.org. https://www.tensorflow.org/.

(Continued)

*Primary Examiner* — Nadeem Iqbal
(74) *Attorney, Agent, or Firm* — Daniel D. Hill (57) ABSTRACT

A method is provided for detecting copying of a machine learning model. A plurality of inputs is provided to a first machine learning model. The first machine learning model provides a plurality of output values. A sequence of bits of a master input is divided into a plurality of subsets of bits. The master input may be an image. Each subset of the plurality of subsets of bits corresponds to one of the plurality of output values. An ordered sequence of the inputs is generated based on the plurality of subsets of bits. The ordered sequence of the inputs is inputted to a second machine learning model. It is then determined if output values from the second machine learning model reproduces the predetermined master input. If the predetermined master input is reproduced, the second machine learning model is a copy of the first machine learning model.

20 Claims, 6 Drawing Sheets

(56) References Cited

U.S. PATENT DOCUMENTS

| | | | |
|---|---|---|---|
| 2019/0171978 A1* | 6/2019 | Bonawitz | G06F 16/95 |
| 2019/0251295 A1 | 8/2019 | Vieyra | |
| 2020/0186361 A1 | 6/2020 | Almgren et al. | |

FOREIGN PATENT DOCUMENTS

| | | |
|---|---|---|
| CN | 107194863 A | 9/2017 |
| JP | 5889727 B2 | 3/2016 |
| WO | WO-2010100398 A1 | 9/2010 |
| WO | 2016043734 A1 | 3/2016 |
| WO | 2018216379 A1 | 11/2018 |

OTHER PUBLICATIONS

Adelsbach, Andre et al. ; "Proving Ownership of Digital Content;" 3rd International Workshop on Information Hiding, IH 1999 LNCS, A. Pfitzmann, Ed., vol. 1768; Springer 1999; pp. 117-133; DOI:10.1007/10719724_9.

Adi, Yossi et al.; "Turning Your Weakness Into A Strength: Watermarking Deep Neural Networks By Backdooring;" USENIX Security Symposium, W. Enck and A. P. Felt, Eds. USENIX Association, 2018, pp. 1615-1631 ; https://www.usenix.org/conference/usenixsecurity18/presentation/adi.

Le Merrer, et al.; "Adversarial Frontier Stitching For Remote Neural Network Watermarking," CoRR, vol. abs/1711.01894, 2017; http://arxiv.org/abs/1711.01894.

Athalye, Anish et al.; "Synthesizing Robust Adversarial Examples;" CoRR, vol. abs/1707.07397, 2017; http://arxiv.org/abs/1707.07397.

Brassard, Gilles et al.; "Minimum Disclosure Proofs Of Knowledge;" Journal of Computer and System Sciences, vol. 37, No. 2, pp. 156-189, 1988; https://doi.org/10.1016/0022-0000(88)90005-0.

Correia-Silva, Jacson Rodrigues, et al.; "Copycat CNN: Stealing Knowledge By Persuading Confession With Random Non-Labeled Data;" Conference on Neural Networks—IJCNN. IEEE, 2018, pp. 1-8; https://doi.org/10.1109/IJCNN.2018.8489592.

Cox, Ingemar J. et al.; "The First 50 Years of Electronic Watermarking;" EURASIP Journal on Applied Signal Processing; vol. 2002, No. 2; pp. 126-132; DOI: 10.1155/S1110865702000525.

Guo, Jia et al.; "Watermarking Deep Neural Networks For Embedded Systems," Computer-Aided Design-ICCAD, I. Bahar, Ed. ACM, 2018, pp. 133:1-133:8; https://doi.org/10.1145/3240765.3240862.

Hamming, R. W.; "Error Detecting And Error Correcting Codes;" Bell System Technical Journal, vol. 29, No. 2, pp. 147-160, 1950.

Hopper, Nicholas et al.; "From Weak to Strong Watermarking;" Theory of Cryptography—TCC, ser. Lecture Notes in Computer Science, S.P. Vadhan, Ed., vol. 4392 2007; pp. 362-382; DOI: 10.1007/978-3-540-70936-7_20.

Rosenblatt, Bill; "Dot Blockchain Media Makes Blockchain Plus Watermarking a Reality;" Copyright and Technology; NYC 2019 Conference Whitepapers/Presentations.

Peng, Hong et al.; "Image Watermarking Method In Multiwavelet Domain Based On Support Vector Machines".The Journal of Systems and Software 83 (2010) 1470-1477; doi>10.1016/j.jss.2010.03.006.

Krizhevsky, Alex; "High-Performance C++/CUDA Implementation Of Convolutional Neural Networks;" https://code.google.com/archive/p/cuda-convnet.

Krizhevsky, Alex; "Learning Multiple Layers Of Features From Tiny Images;" Master's thesis, Department of Computer Science, University of Toronto, 2009.

Lin, Tsung-Yi et al.; "Microsoft COCO: Common Objects In Context;" Computer Vision—ECCV, ser. LNCS, D. J. Fleet, T. Pajdla, B. Schiele, and T. Tuytelaars, Eds., vol. 8693. Springer, 2014, pp. 740-755.

Khan, Asifullah et al.; "Machine Learning Based Adaptive Watermark Decoding in View of Anticipated Attack;" Pattern Recognition 41(8):2594-2610 Aug. 2008; DOI: 10.1016/j.patcog.2008.01.007.

Song, Congzheng et al.; "Machine Learning Models that RememberToo Much;" CCS '17 Proceedings of the 2017 ACM SIGSAC Conference on Computerand Communications Security; pp. 587-601, Dallas, TX, Oct. 30-Nov. 3, 2017; doi>10.1145/3133956.3134077.

Madry, Aleksander et al.; "Towards Deep Learning Models Resistant To Adversarial Attacks;" arXiv preprint arXiv:1706.06083, 2017.

Nagai, Yuki et al.; "Digital Watermarking For Deep Neural Networks," IJMIR, vol. 7, No. 1, pp. 3-16, 2018; https://doi.org/10.1007/s13735-018-0147-1.

Papernot, Nicolas et al.; "Practical Black-Box Attacks Against Machine Learning," Asia Conference on Computer and Communications Security—AsiaCCS, R. Karri, O. Sinanoglu, A. Sadeghi, and X. Yi, Eds. ACM, 2017, pp. 506-519; https://doi.org/10.1145/3052973.3053009.

Zhang, Jialong et al.; "Protecting Intellectual Property Of Deep Neural Networks With Watermarking;" Asia Conference on Computerand Communications Security-AsiaCCS, J. Kim, G. Ahn, S. Kim, Y. Kim, J. L'opez, and T. Kim, Eds. ACM, 2018, pp. 159-172.

Quiring, Erwin et al.; "Forgotten Siblings: Unifying Attacks On Machine Learning And Digital Watermarking;" IEEE European Symposium on Security and Privacy, Euro S&P. IEEE, 2018, pp. 488-502. https://doi.org/10.1109/EuroSP.2018.00041.

Rebuffi, Sylvestre-Alvise et al.; "Learning Multiple Visual Domains With Residual Adapters;" in Neural Information Processing Systems, I. Guyon, U. von Luxburg, S. Bengio, H. M. Wallach, R. Fergus, S. V. N. Vishwanathan, and R. Garnett, Eds., 2017, pp. 506-516; http://papers.nips.cc/paper/6654-learning-multiple-visual-domains-with-residual-adapters.

Kirbiz, Serap et al. "Robust Audio Watermark Decoding By Supervised Learning;" Acoustics, Speech, and Signal Processing, 1988. ICASSP-88., 1988 International Conference on 5:V-V Jun. 2006; DOI: 10.1109/ICASSP.2006.1661387.

Rouhani, Bita Darvish et al.; "Deepsigns: A Generic Watermarking Framework For Protecting The Ownership Of Deep Learning Models;" Cryptology ePrint Archive, Report 2018/311 , 2018; https://eprint.iacr.org/2018/311.

Samuel, A. L et al; "Some Studies In Machine Learning Using The Game Of Checkers;" IBM Journal of Research and Development; vol. 3, No. 3, pp. 210-229; 1959; DOI: 10.1147/rd.441.0206.

Shannon, C. E.; "A Mathematical Theory Of Communication;" Bell System Technical Journal, vol. 27, No. 3, pp. 379-423, 1948.

Sharif, Mahmood et al.; "Accessorize To A Crime: Real And Stealthy Attacks On State-Of-The-Art Face Recognition;" Conference on Computer and Communications Security—CCS, E. R. Weippl, S. Katzenbeisser, C. Kruegel, A. C. Myers, and S. Halevi, Eds. ACM, 2016, pp. 1528-1540; https://doi.org/10.1145/2976749.2978392.

Szegedy, Christian et al.; "Intriguing Properties Of Neural Networks," CoRR, vol. abs/1312.6199, 2013. http://arxiv.org/abs/1312.6199.

Torralba, Antonio et al.; "80 Million Tiny Images: A Large Data Set For Nonparametric Object And Scene Recognition;" IEEE Transactions On Pattern Analysis And Machine Intelligence, vol. 30, No. 11, pp. 1958-1970, 2008.

Tramer, Florian et al.; "Stealing Machine Learning Models Via Prediction APIs;" USENIX Security Symposium, T. Holz and S. Savage, Eds. USENIX Association, 2016, pp. 601-618 ; https://www.usenix.org/conference/usenixsecurity16/technical-sessions/presentation/tramer.

Uchida, Yusuke et al.; "Embedding Watermarks Into Deep Neural Networks;" ACM on International Conference on Multimedia Retrieval—ICMR, B. Ionescu, N. Sebe, J. Feng, M. Larson, R. Lienhart, and C. Snoek, Eds. ACM, 2017, pp. 269-277; https://doi.org/10.1145/3078971.3078974.

Van den Oord, Aaron et al.; "Pixel Recurrent Neural Networks;" International Conference on Machine Learning—ICML, ser. JMLR Workshop and Conference Proceedings, M. Balcan and K. Q. Weinberger, Eds., vol. 48. JMLR.org, 2016, pp. 1747-1756.

Van Schyndel, R.G et al.; "A Digital Watermark;" Proceedings of 1st International Conference on Image Processing, Nov. 13-16, 1994, Austin, TX; DOI: 10.1109/ICIP.1994.413536.

(56) References Cited

OTHER PUBLICATIONS

Venugopal, Ashish et al.; "Watermarking The Outputs Of Structured Prediction With An Application In Statistical Machine Translation;" Empirical Methods in Natural Language Processing—EMNLP. ACL, 2011, pp. 1363-1372.

Non-Final Office Action dated May 27, 2022 for U.S. Appl. No. 16/511,082, 35 Pages.

* cited by examiner

METHOD FOR DETERMINING IF A MACHINE LEARNING MODEL HAS BEEN COPIED

BACKGROUND

Field

This disclosure relates generally to machine learning, and more particularly, to a method for determining if a machine learning model has been copied.

Related Art

Machine learning is becoming more widely used in many of today's applications, such as applications involving forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of the ML model is influenced by its accuracy, execution time, storage requirements, and the quality of the training data. The expertise, time, and expense required for creating and training a machine learning model using this training data results in the ML model being a valuable asset.

Protecting a ML model from attacks has become a problem. When machine learning is provided as a service, a user only has access to the inputs and outputs of the model. Model extraction is an attack that results in a near identical copy of the machine learning model being produced. To extract the model when the machine learning model is provided as a service, valid queries are provided to the model and the resulting output is compiled. Even when an attacker is just given access to the inputs and outputs, the machine learning model can be relatively easily copied. Once an attacker has copied the model, it can be illegitimately used and monetized.

Watermarks are commonly used to mark and prove ownership of a file. Embedding a watermark into a ML model may require the model to be trained with information about the watermark, which may alter the functionality of the model. Also, the watermark needs to be hidden from an attacker. The watermark also needs to be detectable while being difficult to remove or modify when the ML model is copied. The solutions to these problems can be difficult and costly to effectively implement.

Therefore, a need exists for a method to determine if a machine learning model is an illegitimate copy without at least some of the problems described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for detecting copying of a machine learning model $\mathcal{M}$ which can be viewed as a function $\mathcal{M}: \mathbb{A} \to \mathbb{B}$ where $\mathbb{A}$ (resp. $\mathbb{B}$) are the input domain (resp. output domain). An input m is chosen to be the master input that will be bound with the machine learning model to be protected. The master input can be any kind of digitally represented input, for example, an image that has been digitally encoded as a plurality of bits. In an example of a machine learning model for classifying images where the output range is $L=\{0, 1, \ldots, \ell-1\}$ for $\ell \in \mathbb{N}^+$, a plurality of non-problem domain images $t_i^{in} \in \mathcal{M}$ is input into the machine learning model. In response, the machine learning model provides a plurality of output values $\mathcal{M}(t_i^{in})=m_i \in \mathbb{B}$. Each output value represents a category of images and each of the plurality of non-problem domain images are assigned a category by the machine learning model. The master input m is written in a radix-$\ell$ representation as $m=\sum_{i=0}^{n-1} m_i \cdot \ell^i$ for digits $0 \leq m_i < \ell$ and $$n = \left\lceil \frac{m}{\ell} \right\rceil.$$

An image of the previously categorized plurality of non-problem domain images is assigned to each subset of bits based on the category in which the image belongs. The result is an ordered sequence of the non-problem domain images that were categorized to have an output value equal to each subset of bits so that the bits representing the master input are encoded in the ordered sequence of images, thus creating a special set of inputs that binds the master input to the machine learning model. Preferably, each non-problem domain image is only used once in the creation of the ordered sequence. To determine if another machine learning model is a copy of the protected machine learning model, the ordered sequence of images is input to the suspected copy and then it is determined if the bits of the output categories from the suspected copy can be used to reproduce the master image. In addition, error correction code may be applied to bits that represent the master input so that slight differences between the copy and the original model can be detected. Also, a one-way function, such as a hash, may be applied to the ordered sequence of non-problem domain images to make it unmodifiable and to create a seal. The seal may include additional information such as the date and time the seal was created.

By creating a special set of inputs from a master input using the above method, the protected machine learning model does not have to be modified or retrained with, for example, a watermark, and performance of the model is not affected. Error correction code may be used with the special set of inputs to allow detection of a copy even if slight changes were made to the copy. In addition, any number of master inputs may be bound to a ML model. Further, detection of copying may be performed without having direct, or white-box, access to the model. The model protected by the described method is indistinguishable from a model not protected by the described method, and any model may be protected using this method.

In accordance with an embodiment, there is provided, a method for detecting copying of a machine learning model, the method including: inputting a plurality of inputs into a first machine learning model, and in response, the first machine learning model providing a plurality of output values; generating a sequence of bits to represent a predetermined master input; dividing the sequence of bits into a plurality of subsets of bits, wherein each subset of the plurality of subsets of bits corresponds to one of the plurality of output values; generating an ordered sequence of the inputs based on the plurality of subsets of bits; inputting the ordered sequence of inputs to a second machine learning model, and in response, receiving an output value from the second machine learning model for each input of the ordered sequence of inputs; and determining if the output values from the second machine learning model reproduces the predetermined master input, wherein if the predetermined master input is reproduced, the second machine learning model is a copy of the first machine learning model. The predetermined master input may include one of an image, music, text, or video. Dividing the sequence of bits may further include applying an error correction code to the sequence of bits. The error correction code may be one of Hamming code, Reed-Solomon error correction code, and Walsh-Hadamard code. The method may further include: applying a one-way function to the sequence of bits to produce a seal; adding a date and time stamp to the seal; and making the seal unmodifiable. Making the seal unmodifiable may further include inserting the seal into a blockchain. The machine learning model may be a classification type of machine learning model. The plurality of output values may be a plurality of probabilities that the first machine learning model is providing correct results. The plurality of output values may be a plurality of categories for classifying the plurality of inputs.

In another embodiment, there is provided, a method for detecting copying of a first machine learning model, the method including: categorizing a plurality of non-problem domain inputs into a plurality of categories using the first machine learning model, the plurality of categories represented by a corresponding plurality of output values, wherein each of the plurality of non-problem domain inputs is assigned to one of the plurality of categories; generating a sequence of bits to represent a predetermined master input; dividing the sequence of bits into a plurality of subsets of bits, wherein each subset of the plurality of subsets of bits corresponds to one of the plurality of output values; generating an ordered sequence of the non-problem domain inputs based on the plurality of subsets of bits; inputting the ordered sequence of the non-problem domain inputs to a second machine learning model, and in response, receiving an output category value from the second machine learning model for each of the ordered sequence of the non-problem domain inputs; and determining if the output category values reproduces the predetermined master input. The predetermined master input may include one of an image, music, text, and video. Generating a sequence of bits to represent a predetermined master input may further include applying an error correction code to the sequence of bits. The method may further include: applying a one-way function to the sequence of bits to produce a seal; adding a date and time stamp to the seal; and making the seal unmodifiable. Making the seal unmodifiable may further include inserting the seal into a blockchain. Determining if the output category values reproduce the predetermined master input may further include determining that the second machine learning model is a copy of the first machine learning model if the predetermined master input is reproduced.

In yet another embodiment, there is provided, a method for detecting copying of a first machine learning model, the method including: inputting a plurality of non-problem domain inputs into the first machine learning model, and in response, the first machine learning model providing a plurality of output values; generating a sequence of bits to represent a predetermined master input; dividing the sequence of bits into a plurality of subsets of bits, wherein each subset of the plurality of subsets of bits corresponds to one of the plurality of output values; generating an ordered sequence of the non-problem domain objects based on the plurality of subsets of bits; inputting the ordered sequence of the non-problem domain inputs to a second machine learning model, and in response, receiving an output value from the second machine learning model for each input of the ordered sequence of the non-problem domain inputs; determining if the output values received from the second machine learning model reproduces the predetermined master input; applying a one-way function to the sequence of bits to produce a seal; adding a date and time stamp to the seal; and making the seal unmodifiable. Making the seal unmodifiable may further include inputting the seal into a blockchain. Determining if the output values from the second machine learning model reproduce the predetermined master input may further include determining that the second machine learning model is a copy of the first machine learning model if the predetermined master input is reproduced. Generating a sequence of bits to represent a predetermined master input may further include applying an error correction code to the sequence of bits. The error correction code may one of Hamming code, Reed-Solomon error correction code, and Walsh-Hadamard code.

Figure 1:
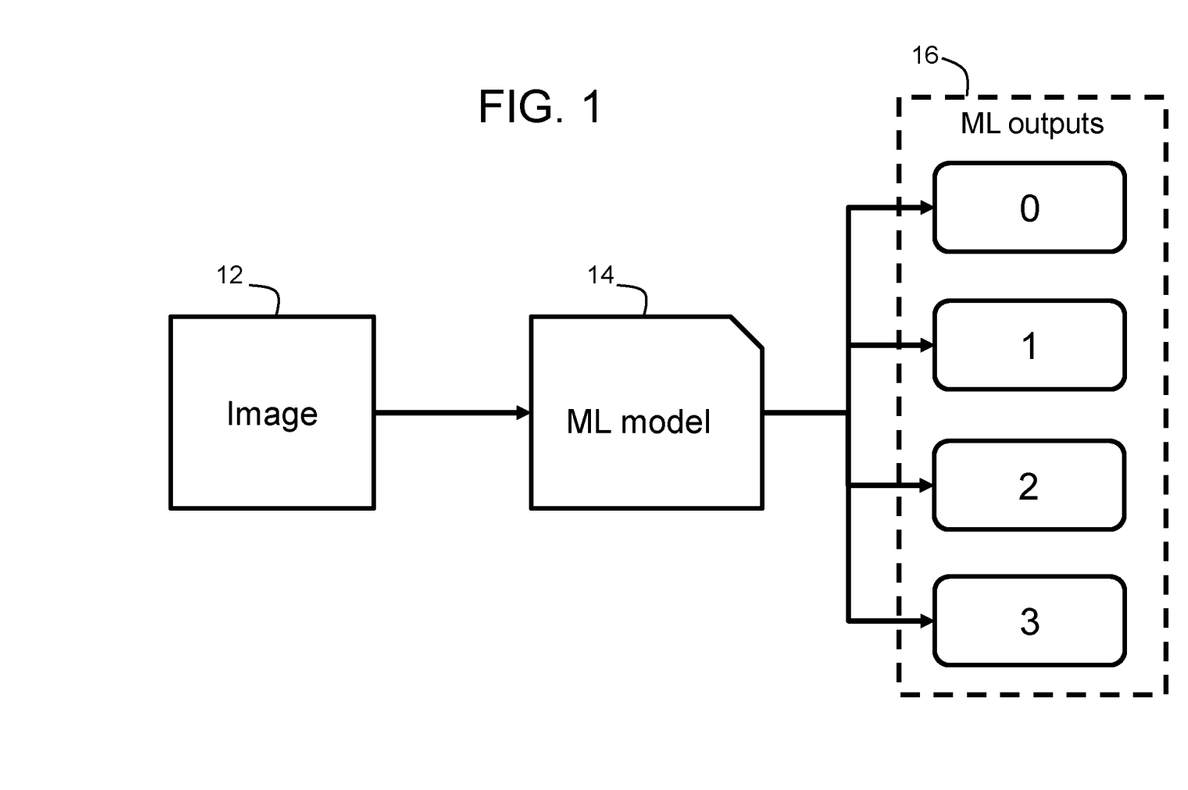
FIG. 1 illustrates a machine learning model.

FIG. 1 illustrates a machine learning model 14. There are different types of machine learning models. Models that use classification and regression algorithms are two types. There are many different uses of a machine learning model. Generally, a machine learning model is used to make predictions about previously unseen inputs based on information presented to the model during a training period. As a simple example, machine learning model 14 may be used to classify images of animals. The ML model may be trained to recognize certain categories of animals using training data that includes pictures of the animal types to be recognized. For example, ML model 14 may be trained to recognize the animal categories of dogs, giraffes, kangaroos, and elephants. After training, during an inference operating phase, ML model 14 is used to categorize pictures of animals not previously input during training. An image 12 of an animal is input to ML model 14 and ML model 14 will analyze and categorize the image into one of the categories it was trained for. The category is then output. The possible categories that are output by the model may be represented by a plurality of digital output values 16. In FIG. 1, the number of output categories is 4, as shown by a number 0 to 3, where each number represents a category output value.

Figure 2:
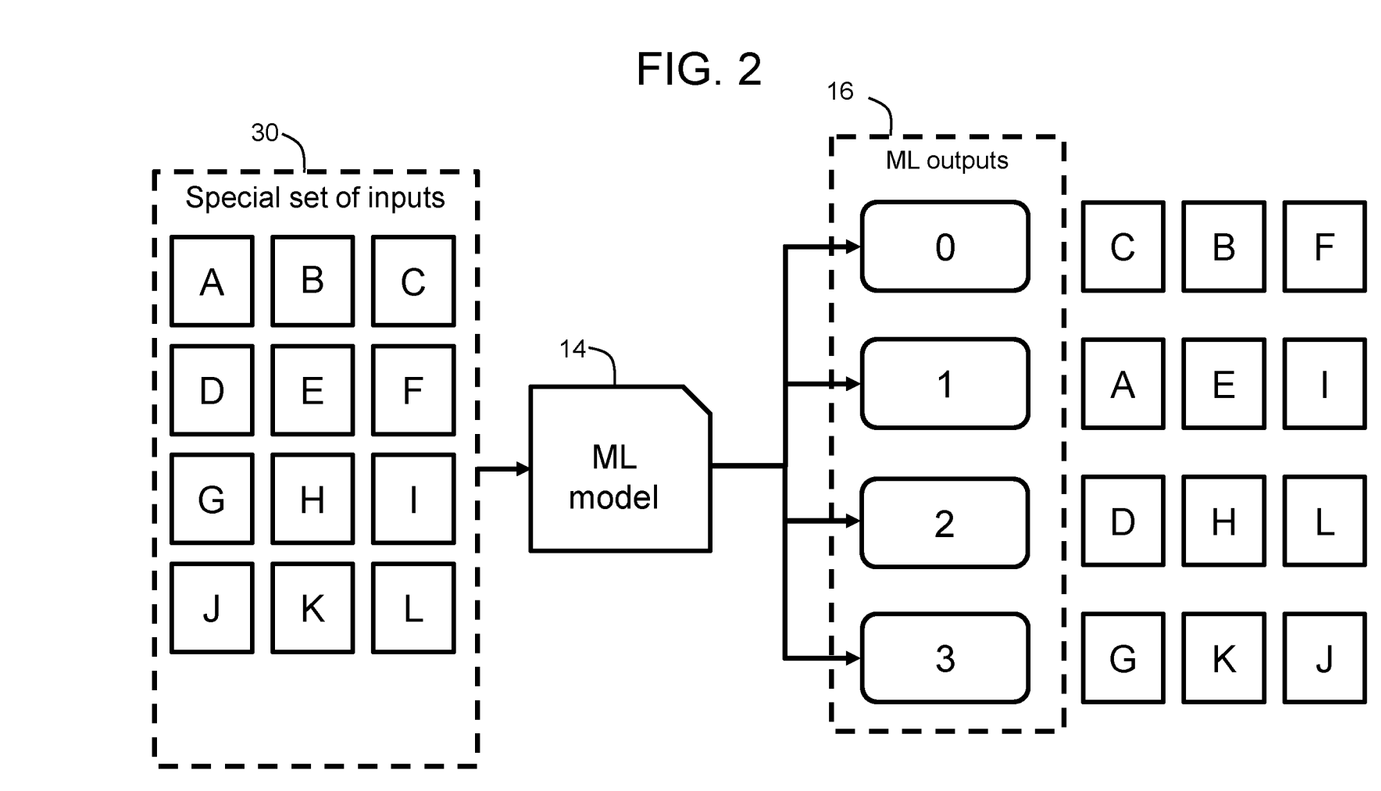
FIG. 2 illustrates a special set of inputs being categorized by the ML model of FIG. 1 in accordance with an embodiment.

FIG. 2 illustrates categorization of special set of inputs 30 by ML model 14 of FIG. 1 in accordance with an embodiment. The special set of inputs 30 is used in a method to detect copying of a ML model. The method is described in the following description and by reference to FIG. 2 through FIG. 5. For normal inference use of ML model 14, the model is only trained with images of, e.g., the types of animals desired to be categorized. The normal type of valid input sample that correctly fits within one of the categories the model is trained for may be referred to as a problem domain input. In contrast, an input sample that is unrelated to the intended use of the model may be referred to as a non-problem domain input sample. A non-problem domain input is not expected to be processed correctly by a ML algorithm. For example, if a ML model classifies images of cats and dogs, a possible non-problem domain input would be an image of a giraffe, which is neither a dog or cat. Generally, a machine learning model cannot distinguish from problem domain input samples and non-problem domain input samples and will attempt to provide an output value for every input sample that is received. However, there are models that are trained to also provide a "don't know" response if the input sample does not fit within a trained for category.

During an inference operating phase, a plurality of non-problem domain special set of inputs 30 is input to machine learning model 14. In one embodiment, special set of inputs 30 may be randomly selected from a larger plurality of non-problem domain images. Special set of inputs 30 may be various types of inputs, e.g., pictures of noise, geometrical shapes, any inputs unrelated to the inputs the model was trained for, or related inputs. In the above example where machine learning model 14 is trained to categorize images of animals, special set of inputs 30 may be images that machine learning model 14 was not trained to recognize. However, ML model 14 will categorize each image of special set of inputs 30 into the categories of animals it has been trained to recognize and provide an output category 16 for each non-problem domain input sample, even though the images may not be animals at all. As an example, special set of inputs 30 were analyzed by machine learning model 14 and three inputs labeled C, B, and F were given output value 0, three inputs A, E, and I were given output value 1, inputs D, H, and L were given output value 2, and inputs G, K, and J were given output value 3. Note that it is not significant that the number of images in each category of FIG. 2 is the same. Non-problem domain inputs are used because it can be difficult to predict which output category the model will assign to an input.

Figure 3:
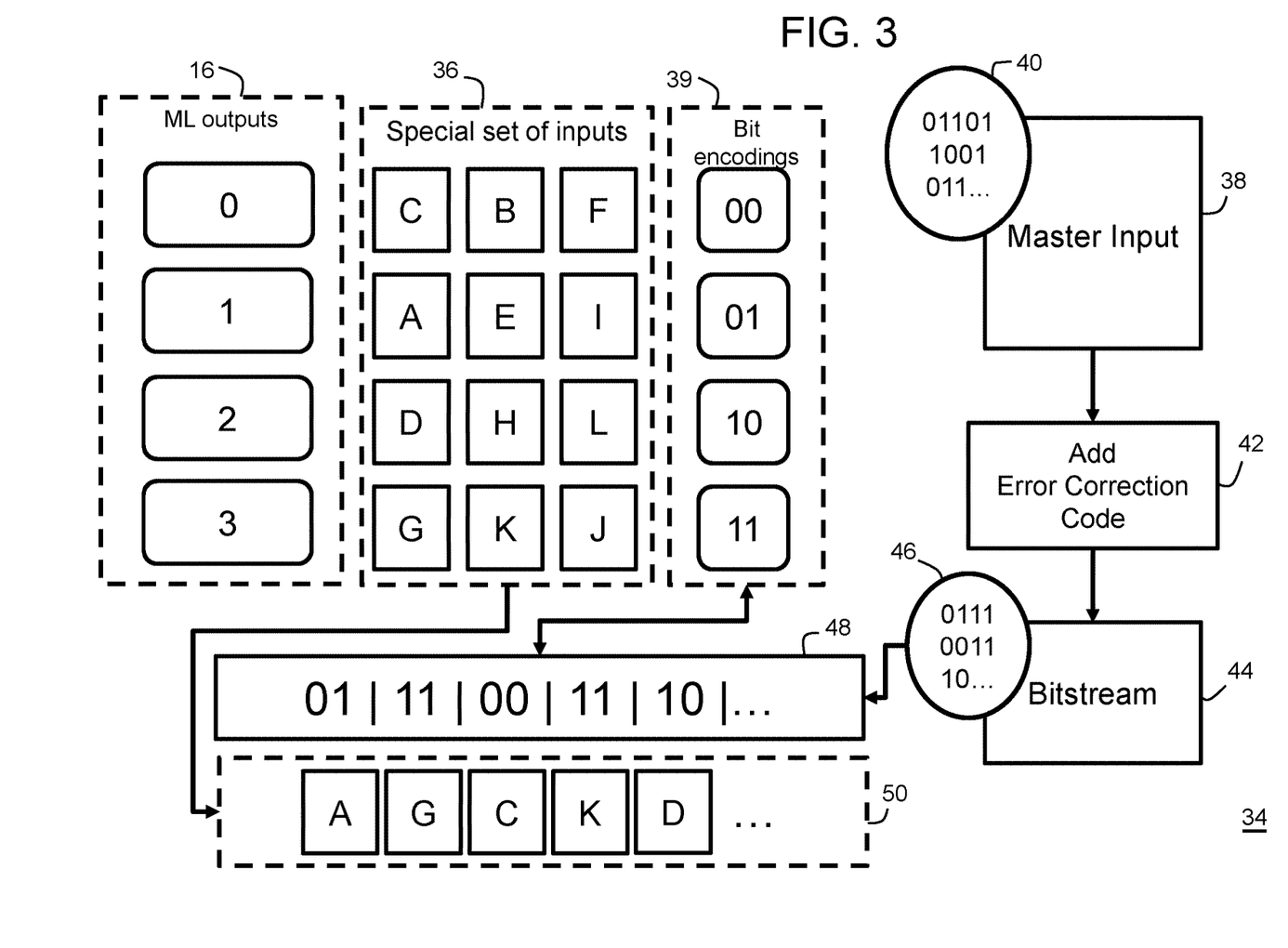
FIG. 3 illustrates a method for encoding a master input for use in detecting copying of a ML model in accordance with an embodiment.

FIG. 3 illustrates method 34 for encoding a master input 38 for use in detecting copying of ML model 14 in accordance with an embodiment. A master input 38 is chosen. The master input 38 may be any digital input, a number, a text, an image, a company logo, or even a video, as long as master input 38 can be encoded using the special set of inputs 30 as described below. Using the special set of inputs 30 that were categorized in FIG. 2, master input 38 is encoded for use with ML model 14 in FIG. 2. Master input 38 is a digital input embodied in a plurality of bits 40. Error correction code (ECC) 42 may be added to plurality of bits 40 to produce an extended bitstream 44 having an extended plurality of bits 46. Conventional error correction code is a type of checksum that is added to data. The checksum introduces redundancies into the data and allows errors in the data to be corrected or restored. There are various ECC schemes. Hamming code, Reed-Solomon error correction, and Walsh-Hadamard codes are some examples of ECC. The use of ECC allows the detection of a stolen ML model even when the model has been modified slightly. This makes it possible to detect a copy that may have been extracted by inputting random samples and observing the ML model outputs of the model being copied. Extracting a copy in this way may result in a less than perfect copy of the stolen model but may still be detected with the described embodiments.

Extended bitstream 46 is encoded using special set of inputs 36. Special set of inputs 36 includes a plurality of inputs labeled A through L. Special set of inputs 36 were produced as described in the discussion of FIG. 2 by inputting a plurality of non-problem domain images through ML model 14 and noting the outputted categories. Because ML model 14 has 4 possible outputs 0-3, the ML outputs can be encoded using two-bit output values as illustrated in FIG. 3 with bit encodings 39. For example, when images C, B, and F were inputted to ML model 14 as discussed in the discussion of FIG. 2, bit encoding 00 is output. Likewise, output value 01 is output from ML model 14 when each of images A, E, and I are input. After ECC is added, bitstream 46 is divided into 2-bit subsets for encoding. The 2-bit subsets are concatenated into 2-bit subsets 48 so that the original bitstream 46 can be reproduced. Special set of inputs 36 is then used to encode each 2-bit subset to produce an ordered sequence of non-problem domain inputs 50. For example, the first 2-bit subset in concatenated 2-bit subsets 48 is 01. It was previously determined that ML model 14 will provide a 01 output value in response to each of inputs A, E, and I (see FIG. 2). In the example of FIG. 3, image A is chosen to encode the first 2-bit subset. Alternately, one of images E or I could also have been chosen. Each subset of concatenated subsets 48 is encoded in the same way, producing ordered sequence of inputs 50. Preferably, each of special set of inputs 36 is only used once.

When ordered sequence of inputs 50 is input to ML model 14, ML model 14 will generate output bit encodings that reproduce extended bitstream 46 when the ordered sequence of inputs 50 is input to ML model 14 in the correct order. In this manner, master input 38 is bound to ML model 14 and can be used to identify ML model 14. The concatenated subsets can each include any number of bits, and generally will equal the number of output categories for which that the ML model was trained. For example, if a classification model can recognize 16 types of objects, 4-bits are required to provide 16 different output values, and each of the concatenated subsets 48 will include 4-bits.

Another way of encoding the special set of inputs may be based on the probabilities, or confidence levels, computed by an ML algorithm of the ML model that an output category is chosen correctly. When an input is received by the ML algorithm, the probability or confidence level may also be output along with the result. If multiple outputs are provided, the output value with the highest probability is used as the final output value. The probabilities may be used to encode the special set of inputs instead of the output categories. By using normal problem domain inputs for classification, the expectation would be that the ML model would classify most of them correctly, so instead of using the categories as with non-problem domain inputs, the highest probability can be used.

For an ML model used to solve a regression problem, the same type of encoding may be used as presented for a classification problem. That is, a subset of bits of the binary representation of the output can be encoded using the ordered special set of inputs.

Several special sets of inputs can be created using multiple master inputs of a ML model. Also, ECC may be used with each set. Having several special sets of inputs to protect one model can be useful. For example, one special set of inputs may be used to discover a stolen ML model and another set may be used to test if the ML model is stolen. Once a special set of inputs is revealed, an attacker can filter out the special set of inputs so that the proof of ownership provided by the special set of inputs will not work. Therefore, having multiple sets may be useful.

Figure 4:
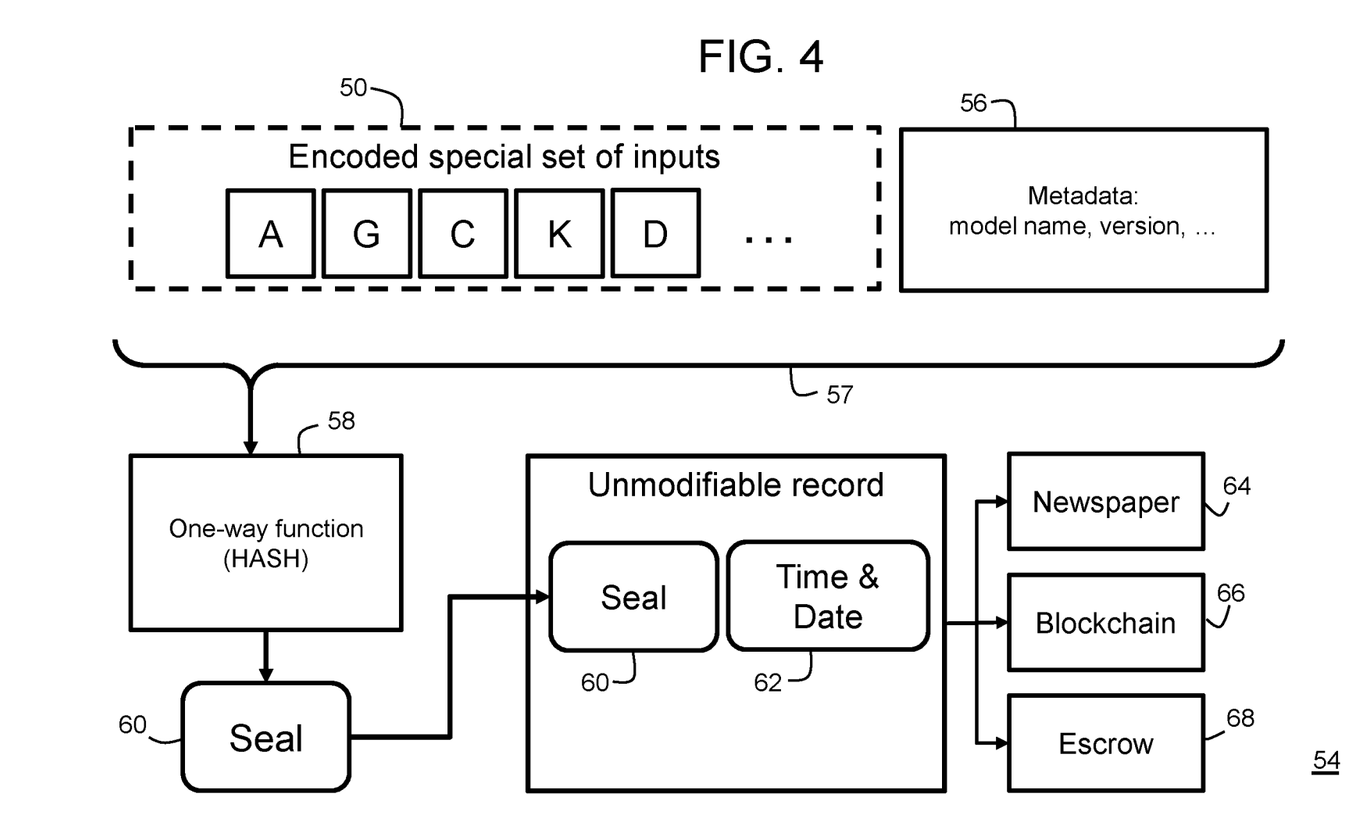
FIG. 4 illustrates a method for creating a commitment seal of the encoded master input of FIG. 3 in accordance with an embodiment.

FIG. 4 illustrates method 54 for creating seal 60 of encoded master input 38 in accordance with an embodiment. Once ordered sequence of inputs 50 is generated (see FIG. 3), seal 60 may be created. Other records including metadata 56 may be combined 57 to ordered sequence of inputs 50 and become part of seal 60. The metadata may include, e.g., model name, version, place and date of creation, etc. The entire record is processed in a one-way cryptographic function such as a hash function or a digital signature algorithm. Applying the one-way function to the ordered sequence of inputs 50 produces seal 60. Applying the one-way function causes seal 60 to be unmodifiable, or at least extremely difficult or unfeasible to modify. Time and date 62 are added to seal 60 prior to publication as described below.

Because the ordered sequence of inputs 50 can be created anytime, it may be desirable to be able to prove that the ordered sequence existed at a certain time and was produced from a particular ML model in order to be able to pre-date a possible copy of the ML model. As one way to provide proof that the seal was created from a particular ML model, or at a particular time, seal 60 could be made a public record by publication, for example, in newspaper 64. Instead of publication, seal 60 may be deposited in escrow account 68 that is maintained by a trusted third party. Maintaining seal 60 in escrow account 68 provides protection to seal 60 from alteration, corruption, or misuse as well as safe keeping. Alternately, seal 60 may be input into blockchain 66. Blockchain 66 provides a public transaction ledger that cannot be tampered with and does not require a trusted third party or central server.

Figure 5:
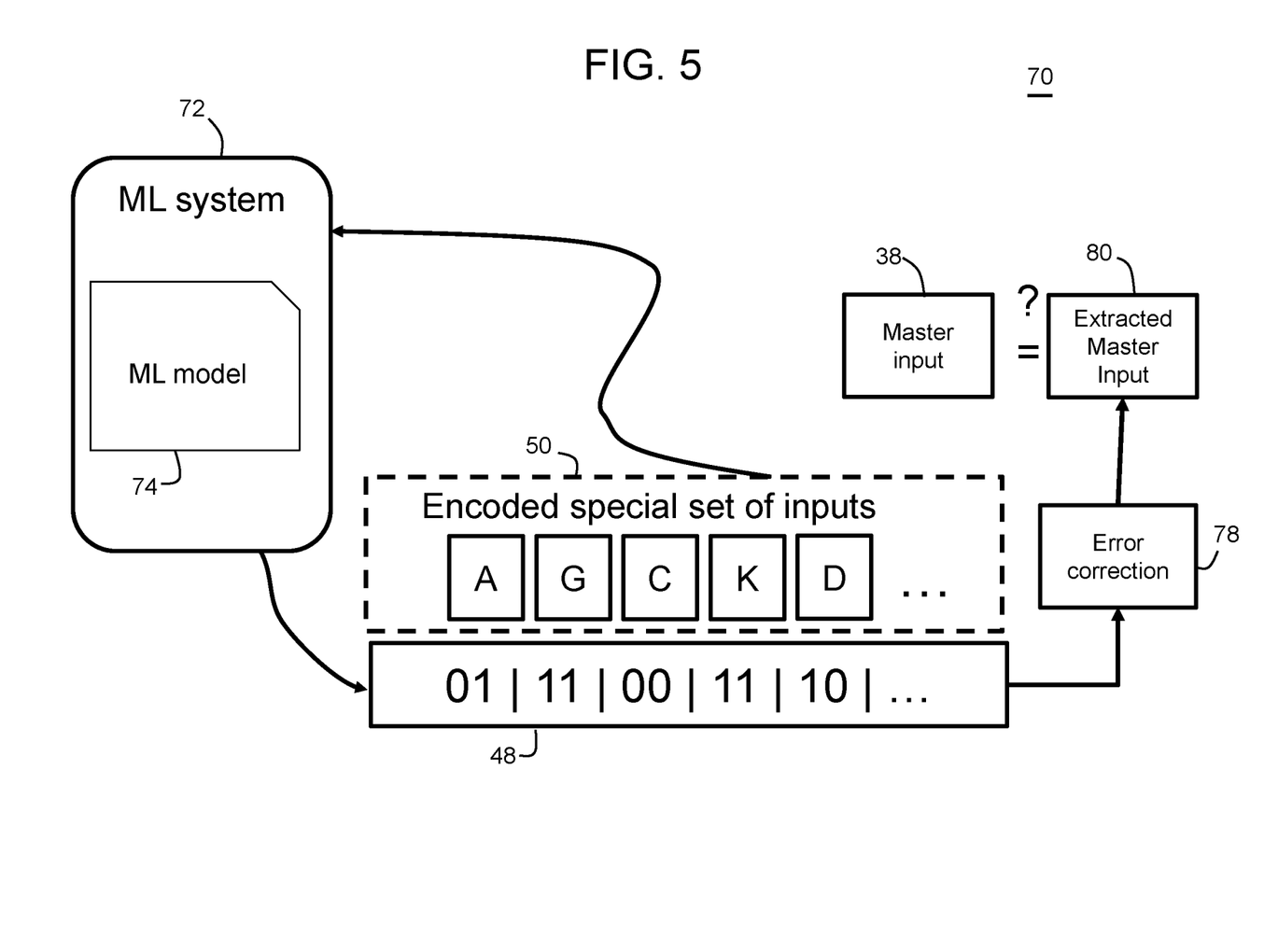
FIG. 5 illustrates a method for detecting copying of a ML model in accordance with an embodiment.

FIG. 5 illustrates method 70 for detecting copying of a ML model in accordance with an embodiment. If it is suspected that ML model 74 may be an illegitimate copy of ML model 14, and at least remote access is available to ML model 74, it can be determined if ML model 74 is a copy by using the encoded special set of inputs 50. First, encoded special set of inputs 50 is input to ML system 72. Output values from ML model 74 are provided in the correct order and concatenated as 2-bit pairs 48. Errors are detected and corrected (if any were found), then the error correction code is removed from the concatenated 2-bit pairs 48 at ECC block 80 to produce an extracted master input 80. If ML model 74 is a copy of ML model 14, ML model 74 will provide the same output categories as did ML model 14 with the same inputs and extracted master input 80 will match master input 38 as was described with respect to FIG. 3. If ECC is used when the master input was encoded, as described above in FIG. 3, method 70 may also be able to detect a copy even when ML model 74 is slightly different than the ML model being copied.

The described method provides a number of advantages and benefits. By creating a special set of inputs from a master input using the above method, the protected machine learning model does not have to be modified or retrained, and performance of the model is not affected. Error correction code may be used with the special set of inputs to allow detection of a copy even if slight changes were made to the copy. In addition, any number of the special set of inputs may be created. Further, detection of copying may be performed without having direct access to the model. The model protected by the special set of inputs is indistinguishable from a model not protected by a special set of inputs.

Figure 6:
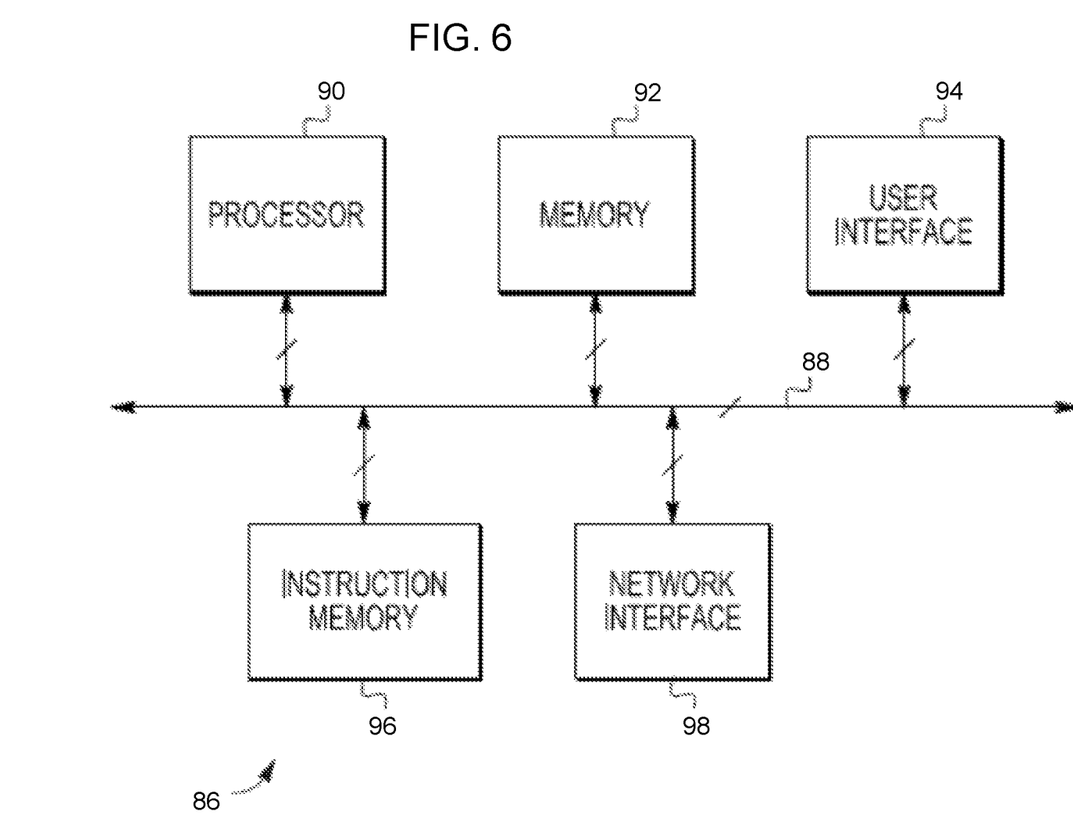
FIG. 6 illustrates a data processing system useful for implementing the machine learning system and method of FIG. 1 to FIG. 5.

FIG. 6 illustrates data processing system 86 useful for implementing the machine learning system and method of FIG. 1 to FIG. 5. Data processing system 86 may be implemented on one or more integrated circuits and may be used in an implementation of the machine learning system in accordance with the described embodiments. Data processing system 86 includes bus 88. Connected to bus 88 is processor 90, memory 92, user interface 94, instruction memory 96, and network interface 98. Processor 90 may be any hardware device capable of executing instructions stored in memory 92 or instruction memory 96. For example, processor 90 may execute the machine learning algorithms using training data stored in memory 92. Processor 90 may have multiple processing cores. Processor 90 may be, for example, a microprocessor, field programmable gate array (FPGA), application-specific integrated circuit (ASIC), or similar device. Processor 90 may be implemented in a secure hardware element and may be tamper resistant.

Memory 92 may be any kind of memory, such as for example, L1, L2, or L3 cache or system memory. Memory 92 may include volatile memory such as static random-access memory (SRAM) or dynamic RAM (DRAM), or may include non-volatile memory such as flash memory, read only memory (ROM), or other volatile or non-volatile memory. Also, memory 92 may be implemented in a secure hardware element. Alternately, memory 66 may be a hard drive implemented externally to data processing system 86. In one embodiment, memory 92 is used to store the training data.

User interface 94 may be connected to one or more devices for enabling communication with a user such as an administrator. For example, user interface 94 may be enabled for coupling to a display, a mouse, a keyboard, or other input/output device. Network interface 98 may include one or more devices for enabling communication with other hardware devices. For example, network interface 98 may include, or be coupled to, a network interface card (NIC) configured to communicate according to the Ethernet protocol. Also, network interface 98 may implement a TCP/IP stack for communication according to the TCP/IP protocols. Various other hardware or configurations for communicating are available.

Instruction memory 96 may include one or more machine-readable storage media for storing instructions for execution by processor 90. In other embodiments, both memories 92 and 96 may also store data upon which processor 90 may operate. Memories 92 and 96 may store, for example, one or more machine learning models, training data, or encryption, decryption, and verification applications. Memory 96 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting copying of a machine learning model, the method comprising:
    inputting a plurality of inputs into a first machine learning model, and in response, the first machine learning model providing a plurality of output values;
    generating a sequence of bits to represent a predetermined master input;
    dividing the sequence of bits into a plurality of subsets of bits, wherein each subset of the plurality of subsets of bits corresponds to one of the plurality of output values;
    generating an ordered sequence of the inputs based on the plurality of subsets of bits;
    inputting the ordered sequence of inputs to a second machine learning model, and in response, receiving an output value from the second machine learning model for each input of the ordered sequence of inputs; and
    determining if the output values from the second machine learning model reproduces the predetermined master input, wherein if the predetermined master input is reproduced, the second machine learning model is a copy of the first machine learning model.

2. The method of claim 1, wherein the predetermined master input comprises one of an image, music, text, or video.

3. The method of claim 1, wherein dividing the sequence of bits further comprises applying an error correction code to the sequence of bits.

4. The method of claim 3, wherein the error correction code is one of Hamming code, Reed-Solomon error correction code, and Walsh-Hadamard code.

5. The method of claim 1, further comprising:
    applying a one-way function to the sequence of bits to produce a seal;
    adding a date and time stamp to the seal; and
    making the seal unmodifiable.

6. The method of claim 5, wherein making the seal unmodifiable further comprises inserting the seal into a blockchain.

7. The method of claim 1, wherein the machine learning model is a classification type of machine learning model.

8. The method of claim 1, wherein the plurality of output values is a plurality of probabilities that the first machine learning model is providing correct results.

9. The method of claim 1, wherein the plurality of output values is a plurality of categories for classifying the plurality of inputs.

10. A method for detecting copying of a first machine learning model, the method comprising:
    categorizing a plurality of non-problem domain inputs into a plurality of categories using the first machine learning model, the plurality of categories represented by a corresponding plurality of output values, wherein each of the plurality of non-problem domain inputs is assigned to one of the plurality of categories;
    generating a sequence of bits to represent a predetermined master input;
    dividing the sequence of bits into a plurality of subsets of bits, wherein each subset of the plurality of subsets of bits corresponds to one of the plurality of output values;
    generating an ordered sequence of the non-problem domain inputs based on the plurality of subsets of bits;
    inputting the ordered sequence of the non-problem domain inputs to a second machine learning model, and in response, receiving an output category value from the second machine learning model for each of the ordered sequence of the non-problem domain inputs; and
    determining if the output category values reproduces the predetermined master input.

11. The method of claim 10, wherein the predetermined master input comprises one of an image, music, text, and video.

12. The method of claim 10, wherein generating a sequence of bits to represent a predetermined master input further comprises applying an error correction code to the sequence of bits.

13. The method of claim 10, further comprising:
    applying a one-way function to the sequence of bits to produce a seal;
    adding a date and time stamp to the seal; and
    making the seal unmodifiable.

14. The method of claim 13, wherein making the seal unmodifiable further comprises inserting the seal into a blockchain.

15. The method of claim 10, wherein determining if the output category values reproduce the predetermined master input further comprises determining that the second machine learning model is a copy of the first machine learning model if the predetermined master input is reproduced.

16. A method for detecting copying of a first machine learning model, the method comprising:
    inputting a plurality of non-problem domain inputs into the first machine learning model, and in response, the first machine learning model providing a plurality of output values;
    generating a sequence of bits to represent a predetermined master input;
    dividing the sequence of bits into a plurality of subsets of bits, wherein each subset of the plurality of subsets of bits corresponds to one of the plurality of output values;
    generating an ordered sequence of the non-problem domain objects based on the plurality of subsets of bits;
    inputting the ordered sequence of the non-problem domain inputs to a second machine learning model, and in response, receiving an output value from the second machine learning model for each input of the ordered sequence of the non-problem domain inputs;
    determining if the output values received from the second machine learning model reproduces the predetermined master input;

applying a one-way function to the sequence of bits to produce a seal;
adding a date and time stamp to the seal; and
making the seal unmodifiable.

17. The method of claim 16, wherein making the seal unmodifiable further comprises inputting the seal into a blockchain.

18. The method of claim 16, wherein determining if the output values from the second machine learning model reproduce the predetermined master input further comprises determining that the second machine learning model is a copy of the first machine learning model if the predetermined master input is reproduced.

19. The method of claim 16, wherein generating a sequence of bits to represent a predetermined master input further comprises applying an error correction code to the sequence of bits.

20. The method of claim 19, wherein the error correction code is one of Hamming code, Reed-Solomon error correction code, and Walsh-Hadamard code.

* * * * *